Jan. 22, 1924.

E. H. DAVIS

VALVE

Filed April 4, 1921

1,481,663

Edwin H. Davis, INVENTOR.

By Alexander & Dowell
Attorneys.

Patented Jan. 22, 1924.

1,481,663

UNITED STATES PATENT OFFICE.

EDWIN H. DAVIS, OF BATTLE CREEK, MICHIGAN, ASSIGNOR TO AMERICAN STEAM PUMP COMPANY, OF BATTLE CREEK, MICHIGAN, A CORPORATION OF MICHIGAN.

VALVE.

Application filed April 4, 1921. Serial No. 458,377.

*To all whom it may concern:*

Be it known that I, EDWIN H. DAVIS, a citizen of the United States, residing at Battle Creek, in the county of Calhoun and State of Michigan, have invented certain new and useful Improvements in Valves; and I hereby declare that the following is a full, clear, and exact description thereof, reference being had to the accompanying drawings, which form part of this specification.

This invention is a novel valve, especially adapted for use in so-called emulsifying machines. The invention provides a valve which can be used for smoothing milk or cream and removing the fat globules therefrom by forcing same under high pressure between two highly polished disks or surfaces in the valve, which disks are preferably formed of glass or other suitable non-corrosive or highly wear resisting material. The objects of the invention are to make a valve of this nature in which the main operative parts are readily accessible for removal, cleansing or repairs; and which is simpler than other valves now on the market for the same purpose.

I will explain the invention with reference to the accompanying drawings which illustrate one practical embodiment thereof and refer to the claims for summaries of the essentials of the invention and novel features of construction and combinations of parts for which protection is desired.

In said drawings.

Figure 1:
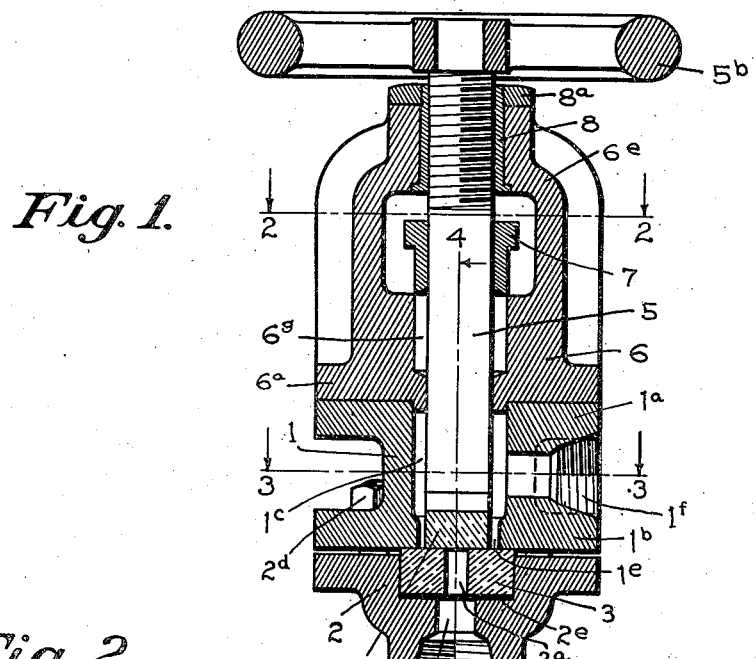
Fig. 1 is a vertical longitudinal section through the complete valve.

The embodiment of the invention shown in the drawings consists of a main cylindric body 1 which is provided with upper and lower flanges $1^a$ and $1^b$ and is preferably smoothly dressed on its upper and lower surfaces, and has an axial bore or chamber $1^c$ which may be contracted at its lower end as shown at $1^e$. The chamber $1^c$ has an outlet opening $1^f$ (Fig. 1) the outer end of which is preferably internally threaded for connection with a discharge pipe (not shown).

Figure 3:
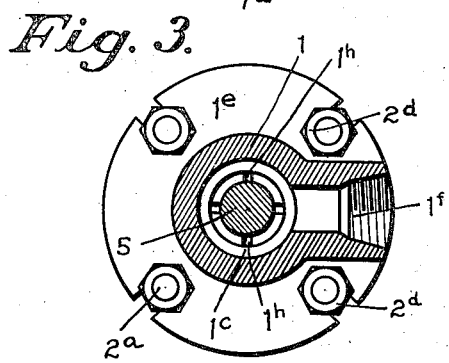
Fig. 3 is a transverse section on the line 3—3 Fig. 1.

To the lower end of the body 1 is attached a bottom member 2 which is preferably securely but detachably connected to the body 1 by means of swivel bolts $2^a$ pivoted on pins $2^b$ in slots $2^c$ in the member 2, and adapted to be swung into engagement with radially disposed slots $1^g$ in the flange $1^b$ of the body (see Figs. 3 and 4) and are confined thereto by nuts $2^d$. This connection makes it possible to easily disconnect the bottom member 2 from the body 1, so that the interior of the body member, and the smoothing disks hereinafter referred to, can be easily removed, cleansed and replaced.

The bottom member has a recess $2^e$ in its upper side in which is placed a disk 3 which is preferably formed of hard highly polished glass, but it may be formed of any other suitable material. This disk 3 has an axial opening $3^a$ which connects with a preferably axially disposed inlet opening $2^g$ in the member 2. The outer end of this opening $2^g$ may be internally threaded as shown for connection with a supply pipe (not shown).

The disk 3 is of a larger diameter than the outer end of the opening $1^e$ in the body, and it is closely fitted against the lower end of the body 1 and is tightly clamped thereto by means of the bolts $2^a$, so that fluid can not leak between the disk and end of body 1.

Mounted upon the disk 3 within the body 1 is a smaller similar disk 4, which is smooth and highly polished on its under side to register with the smooth and highly polished upper side of the disk 3. The disk 4 is preferably made of the same material as the disk 3 and is imperforate. This disk 4 covers the opening $3^a$ in disk 3 and is centered in the lower end of the opening in the body by means of lugs $1^h$, indicated in Fig. 3, which may project from the side walls of the opening $1^e$. This disk 4 may be centered in any other suitable manner provided a passage or passages are left for the flow of fluid between the said disk and the wall of the part $1^e$.

Figure 2:
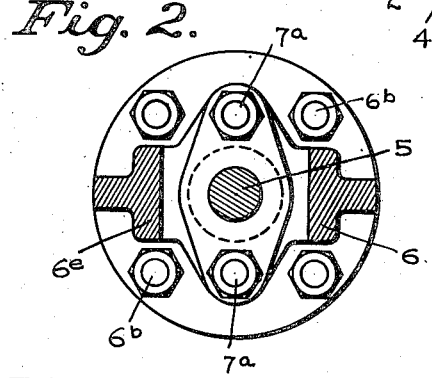
Fig. 2 is a transverse section on the line 2—2 Fig. 1.
Figure 4:
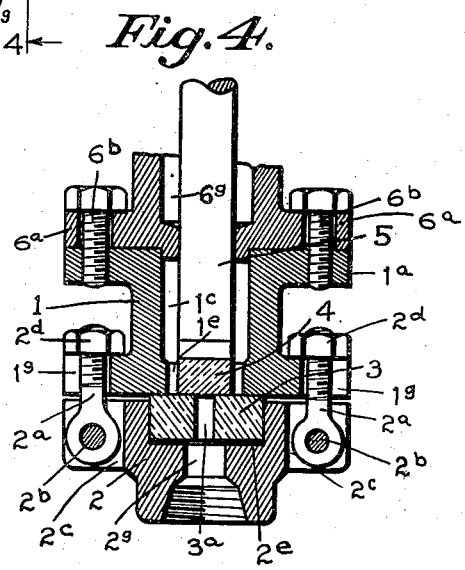
Fig. 4 is a partial vertical section on line 4—4 Fig. 1.

The disk 4 is held to its seat on the disk 3 and in close contact therewith by means of a rod or stem 5 which enters the chamber $1^c$ and is disposed axially thereof and passes through a stuffing box $6^g$ in a yoke bonnet member 6 which is mounted upon and closes the upper end of the body 1, As shown this yoke bonnet member 6 has a cylindric flange 6ᵃ on its lower end which is closely fitted to the upper end and flange 1ᵃ of the body 1 and is firmly secured thereto by any suitable means, preferably by tap bolts 6ᵇ extending through apertures in the flange 6ᵃ and engaging threaded apertures in the flange 1ᵃ (see Figs. 2 and 4). The yoke bonnet has a stuffing box 6ᵍ through which the stem 5 passes, and said stuffing box may be filled with any suitable packing and closed by a gland 7, of the usual construction, fastened to the yoke bonnet by means of tap bolts 7ᵃ in the usual manner (see Fig. 2). From the base of this bonnet member rises the yoke portion 6ᵉ and in the top of this yoke is an opening through which the upper end of the stem 5 passes. In this opening is secured a removable bushing 8, preferably of bronze or other suitable metal, which is externally threaded on its upper end and secured in place by a cap nut 8ᵃ.

The bushing 8 is provided with internal threads which engage a correspondingly threaded portion of the stem 5; and the stem is provided above the bushing with any suitable means for turning it, a hand wheel 5ᵇ being shown in the drawings. The thread should be made very fine, or of very slight pitch, so that it is possible to get a very fine regulation of the amount of separation of the disk 4 from the disk 3. Practically the valve thread is so fine that the valve stem would travel a very slight distance for each quarter turn thereof.

In operation, when the parts are properly assembled, the disk 4 should be set down upon the disk 3; and then slightly released so that fluid, such as milk, can be forced under very great pressure between the disks 3 and 4, the amount of pressure required to force the liquid between the disks being regulable by adjusting the stem 5, the stem holding the disk 4 against the fluid pressure and slightly spaced from its seat on the disk 3. This valve can be used in connection with a suitable fluid pump for emulsifying milk or other fluids in the well known manner, and further description thereof is unnecessary.

It is obvious that changes might be made in nonessentials of the structure of the valve while retaining the essentials of the invention and I do not consider it limited to the specific construction shown; therefore what I claim is:

1. A valve comprising a body having an axial chamber, and an outlet communicating with said chamber; a bottom member having an axial opening, and a recess in its upper side; means for securing the bottom member to one end of the body member; a disk confined in the recess in the bottom member; said disk having a small axial fluid passage; an imperforate disk within the chamber and adapted to close said fluid passage; a yoke member; means for attaching the yoke member to the body, said yoke member having a valve stem guide; and a valve stem extending through the guide into the chamber and adapted to engage the second disk and hold it against the fluid pressure to control the flow of fluid between the disks, substantially as described.

2. A valve comprising a body having an axial chamber, an outlet communicating with said chamber, and upper and lower flanges; a bottom member having a peripheral flange; an axial opening and a recess in its upper side; means for detachably securing the bottom member to the body; a disk in the recess in the bottom member having an axial fluid passage communicating with the axial opening of the bottom member and the chamber in the body; a smaller disk within the body member adapted to close said fluid passage; a yoke bonnet member; means for attaching the bonnet member to the body, said bonnet member having a stuffing box and a valve stem guide above the stuffing box; and a valve stem extending through the stuffing box and guide into the chamber and adapted to engage the smaller disk and hold it against the fluid pressure to control the flow of fluid between the disks, substantially as described.

3. A valve comprising a body having an axial chamber; an outlet communicating with said chamber and upper and lower external flanges; a bottom member having an axial opening, a recess in its upper side and a peripheral flange; bolts engaging the opposed flanges of the body and bottom member for securing the bottom member to the body member; a disk in the recess in the bottom member having an axial fluid passage communicating with the axial opening of the body member and the chamber in the body; a second disk within the body member adapted to close said fluid passage; a yoke bonnet member having a flange, bolts uniting the flanges of the bonnet member and body, said bonnet member having a stuffing box and a valve stem guide above the stuffing box; and a valve stem extending through the valve stem guide and stuffing box into the chamber, and adapted to engage the second disk and hold it against the fluid pressure to control the flow of fluid between the disks.

4. A valve comprising a casing having a chamber, an outlet communicating with said chamber and an inlet; a flat surfaced disk confined in the casing between the inlet and said chamber and having a small central fluid passage communicating with said inlet and chamber, an unattached flat disk within the chamber adapted to cover the fluid passage in the other disk; and a valve stem projecting into the chamber and adapted to freely engage the unattached disk and hold it against the fluid pressure to cause the fluid to spread in a thin film between the disks before entering the chamber, the disks being formed of hard polished refractory non-metallic material, substantially as described.

5. A valve comprising a body having a chamber, a recess below the chamber, an outlet communicating with said chamber, and an inlet; a flat surfaced disk confined in the said recess and having a small axial fluid passage communicating with the inlet and chamber; a second flat surfaced disk within the chamber adapted to cover the fluid passage in the other disk; and a valve stem projecting into the chamber and adapted to engage the second named disk and hold it against the fluid pressure in position opposite the other disk to cause the fluid to spread in a thin film between the disks before entering the chamber, the second disk permitting passage of fluid between its edges and the wall of the chamber of the body and both disks being made of hard non-metallic refractory material, substantially as described.

6. A valve comprising a body having a chamber and an outlet communicating with said chamber; a bottom member having an inlet; means for securing the bottom member to the body; a disk confined between the body and the bottom member; said disk having a small axial fluid passage communicating with the inlet and said chamber; a second disk smaller than said first mentioned disk, and located above the first disk and spaced from the inner wall of the body; and a valve stem projecting into the chamber and having its inner end flattened and freely bearing on the surface of the smaller disk and adapted to hold the smaller disk against the fluid pressure to cause the fluid to spread in a thin film between the disks before entering the chamber, substantially as described.

7. A valve comprising a body having a chamber and an outlet communicating with said chamber; a bottom member having a recess in its upper side and an inlet communicating with said recess; means for securing the bottom member to the body; a disk confined in the recess in the bottom member and having a small axial fluid passage; a second flat disk loosely confined within the body; a yoke member attached to the other end of the body; and a valve stem projecting through the yoke member into the body and having its inner end loosely engaged with the second disk and adapted to hold it against the fluid pressure to cause the fluid to spread in a thin film between the disks substantially as described.

In testimony that I claim the foregoing as my own, I affix my signature.

EDWIN H. DAVIS.